US010776327B2

(12) United States Patent
Kaiser et al.

(10) Patent No.: US 10,776,327 B2
(45) Date of Patent: Sep. 15, 2020

(54) STORAGE DEVICE MANUFACTURING AND ASSOCIATED BLOCK CHAIN GENERATION THEREOF

(71) Applicant: Seagate Technology LLC, Cupertino, CA (US)

(72) Inventors: David R. Kaiser, Apple Valley, MN (US); Timothy John Courtney, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 43 days.

(21) Appl. No.: 16/116,701

(22) Filed: Aug. 29, 2018

(65) Prior Publication Data

US 2020/0073970 A1 Mar. 5, 2020

(51) Int. Cl.
*G06F 16/21* (2019.01)
*G06F 21/60* (2013.01)
*G11B 20/18* (2006.01)

(52) U.S. Cl.
CPC .......... *G06F 16/211* (2019.01); *G06F 21/602* (2013.01); *G11B 20/182* (2013.01)

(58) Field of Classification Search
CPC ..................................................... G06F 16/211
USPC ................................ 714/718, 723, 720, 722
See application file for complete search history.

(56) References Cited

U.S. PATENT DOCUMENTS

| 7,055,029 | B2 | 5/2006 | Collins et al. |
| 7,322,042 | B2 | 1/2008 | Srinivasan et al. |
| 7,457,168 | B2 | 11/2008 | Jeong et al. |
| 7,581,242 | B1 | 8/2009 | Oget et al. |
| 7,768,835 | B2 | 8/2010 | Goda |
| 8,533,856 | B2 | 9/2013 | Estakhri et al. |
| 8,726,407 | B2 | 5/2014 | Etchegoyen |
| 9,343,160 | B1 | 5/2016 | Dutta et al. |
| 9,478,296 | B2 | 10/2016 | Nam |
| 2013/0285739 | A1* | 10/2013 | Blaquiere ...... G01R 31/318555 327/565 |
| 2016/0116523 | A1* | 4/2016 | Trotta ................ G01R 31/2822 343/703 |
| 2017/0123925 | A1* | 5/2017 | Patnaik ................. G06F 21/577 |

\* cited by examiner

*Primary Examiner* — Fritz Alphonse
(74) *Attorney, Agent, or Firm* — Mueting Raasch Group

(57) ABSTRACT

A method includes generating a plurality of blocks of a block chain wherein the plurality of blocks is associated with components of a storage device. The plurality of blocks is generated by a device other than the storage device when the components are manufactured. The method further includes storing a copy of a ledger associated with the generated blocks on the storage device when the storage device comprises computing power sufficient to generate blocks of a block chain. The method also includes generating additional blocks of the block chain. The additional blocks of the block chain are associated with additional components of the storage device when the additional components are manufactured. The additional blocks are generated independently by the device and by the storage device and wherein respective ledgers are updated.

20 Claims, 5 Drawing Sheets

STORAGE DEVICE MANUFACTURING AND ASSOCIATED BLOCK CHAIN GENERATION THEREOF

SUMMARY

Provided herein is a method including generating a plurality of blocks of a block chain wherein the plurality of blocks is associated with components of a storage device. The plurality of blocks is generated by a device other than the storage device when the components are manufactured. The method further includes storing a copy of a ledger associated with the generated blocks on the storage device when the storage device comprises computing power sufficient to generate blocks of a block chain. The method also includes generating additional blocks of the block chain. The additional blocks of the block chain are associated with additional components of the storage device when the additional components are manufactured. The additional blocks are generated independently by the device and by the storage device wherein respective ledgers are updated.

These and other features and advantages will be apparent from a reading of the following detailed description.

DESCRIPTION

Figure 1B:
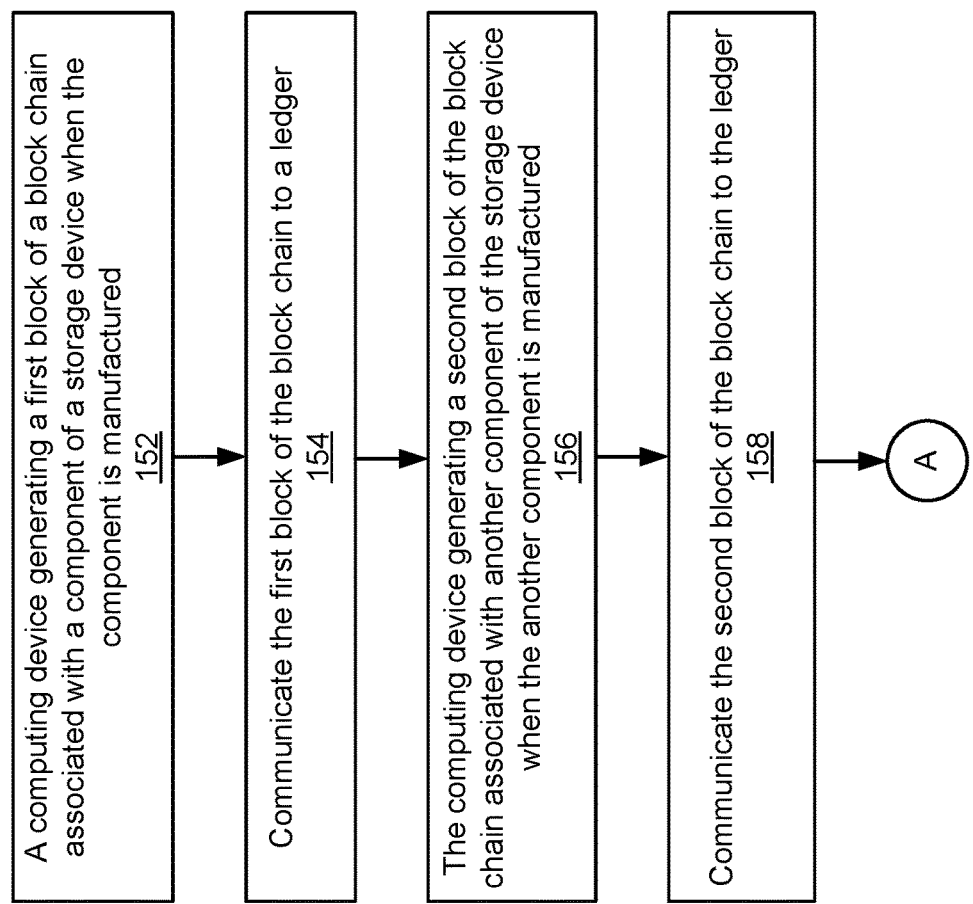
FIGS. 1A-1C show manufacturing a storage device and generation of block chains associated therewith according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device or a processor. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "decrypting," "encrypting," "processing," "updating," "instantiating," "communicating," "comparing," "issuing," "synching," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

There has been a growing need for determining authenticity of a device (proof of authentic hardware) and/or its components (proof of component origins). For example, a need has arisen to determine whether a storage device, e.g., hard drive, solid state drive, etc., is authentic and whether its supply chain is secure by publicly determining that the product was manufactured by the manufacturer that claims that it manufactured the product. Authenticating a device and/or components thereof has become more important recently, given an increase in security breaches associated with a number of different electronic manufacturers.

It is appreciated while the embodiments are described with respect to a storage device and in particular hard drive, the embodiments are not limited thereto. For example, the embodiments are equally applicable to other electronic devices, e.g., solid state drive.

Figure 1A:
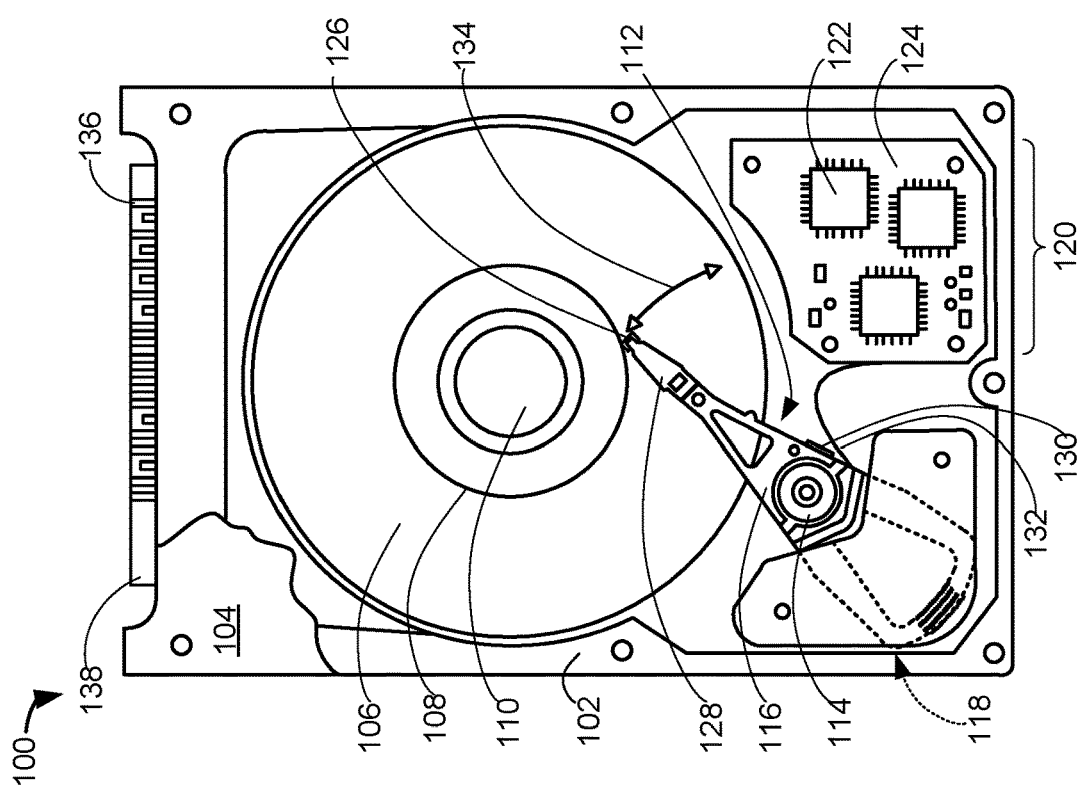

Referring now to FIG. 1A, manufacturing a storage device and proof of origin according to one aspect of the present embodiments is shown. A disk drive 100 generally includes a base plate 102 and a cover 104 that may be disposed on the base plate 102 to define an enclosed housing for various disk drive components. The disk drive 100 includes one or more data storage disks 106 of computer-readable data storage media. Typically, both of the major surfaces of each data storage disk 106 include a plurality of concentrically disposed tracks for data storage purposes. Each data storage disk 106 is mounted on a hub 108, which in turn is rotatably interconnected with the base plate 102 and/or cover 104. Multiple data storage disks 106 are typically mounted in vertically spaced and parallel relation on the hub 108. A spindle motor 110 rotates the data storage disks 106.

The disk drive 100 also includes an actuator arm assembly 112 that pivots about a pivot bearing 114, which in turn is rotatably supported by the base plate 102 and/or cover 104. The actuator arm assembly 112 includes one or more individual rigid actuator arms 116 that extend out from near the pivot bearing 114. Multiple actuator arms 116 are typically disposed in vertically spaced relation, with one actuator arm 116 being provided for each major data storage surface of each data storage disk 106 of the disk drive 100. Other types of actuator arm assembly configurations could be utilized as well, an example being an "E" block having one or more rigid actuator arm tips, or the like, that cantilever from a common structure. Movement of the actuator arm assembly 112 is provided by an actuator arm drive assembly, such as a voice coil motor 118 or the like. The voice coil motor 118 is a magnetic assembly that controls the operation of the actuator arm assembly 112 under the direction of control electronics 120.

The control electronics 120 may include a plurality of integrated circuits 122 coupled to a printed circuit board 124. The control electronics 120 may be coupled to the voice coil motor assembly 118, a slider 126, or the spindle motor 110 using interconnects that can include pins, cables, or wires (not shown).

A load beam or suspension 128 is attached to the free end of each actuator arm 116 and cantilevers therefrom. Typically, the suspension 128 is biased generally toward its corresponding data storage disk 106 by a spring-like force. The slider 126 is disposed at or near the free end of each suspension 128. What is commonly referred to as the read/write head (e.g., transducer) is appropriately mounted as a head unit (not shown) under the slider 126 and is used in disk drive read/write operations. The head unit under the slider 126 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 126 is connected to a preamplifier 130, which is interconnected with the control electronics 120 of the disk drive 100 by a flex cable 132 that is typically mounted on the actuator arm assembly 112. Signals are exchanged between the head unit and its corresponding data storage disk 106 for disk drive read/write operations. In this regard, the voice coil motor 118 is utilized to pivot the actuator arm assembly 112 to simultaneously move the slider 126 along a path 134 and across the corresponding data storage disk 106 to position the head unit at the appropriate position on the data storage disk 106 for disk drive read/write operations.

When the disk drive 100 is not in operation, the actuator arm assembly 112 is pivoted to a "parked position" to dispose each slider 126 generally at or beyond a perimeter of its corresponding data storage disk 106, but in any case in vertically spaced relation to its corresponding data storage disk 106. In this regard, the disk drive 100 includes a ramp assembly (not shown) that is disposed beyond a perimeter of the data storage disk 106 to both move the corresponding slider 126 vertically away from its corresponding data storage disk 106 and to also exert somewhat of a retaining force on the actuator arm assembly 112.

Exposed contacts 136 of a drive connector 138 along a side end of the disk drive 100 may be used to provide connectivity between circuitry of the disk drive 100 and a next level of integration such as an interposer, a circuit board, a cable connector, or an electronic assembly. The drive connector 138 may include jumpers (not shown) or switches (not shown) that may be used to configure the disk drive 100 for user specific features or configurations. The jumpers or switches may be recessed and exposed from within the drive connector 138.

It is appreciated that during the manufacturing process, a computing device (separate from the storage device being manufactured) generates the first few blocks of the block chains. For example, referring to FIG. 1B, at step 152, the computing device, e.g., a processor, a computer, a controller, a field programmable gate array (FPGA), etc., generates a first block of a block chain. The first block that is generated is associated with a component of a storage device when the component is being manufactured. In some embodiments, at step 154, the first block is communicated to a ledger. In some embodiments, the computing device that generates the block may also store the ledger. In some embodiments, the ledger may be stored by a different device, e.g., a storage medium. It is appreciated that the block being generated may include certain information regarding the component being manufactured, e.g., model number, serial number, self-servo write which is the code to rewrite servo, testers used to test the component(s), version of the firmware, etc.

At step 156, the computing device generates a second block of the block chain. The second block that is generated is associated with another component of the storage device when the component is being manufactured. In some embodiments, at step 158, the second block is communicated to the ledger. In some embodiments, the computing device that generates the block may also store the ledger. In some embodiments, the ledger may be stored by a different device, e.g., a storage medium.

It is appreciated that in some embodiments, the computing device creates transactions (blocks) for the block chain and stores the ledger on a factory storage device. For example, the computing device may create blocks of the block chains for components that are being assembled to manufacture the storage device. It is appreciated that the storage device is not powered on at this stage. The computing device continues to generate blocks for the components as they are assembled and updates the ledger. In some embodiments, the storage device may be connected to one or more test systems where the storage device is powered up and where it receives initial test codes. According to some embodiments, the storage device performs a series of tests and initializes its local storage system. The blocks associated with the tests being performed and/or the initialization may be added, by the computing device, to the ledger. In some embodiments, the blocks associated with the tests are generated by the storage device but added to the ledger and the block chain by the computing device.

Figure 1C:
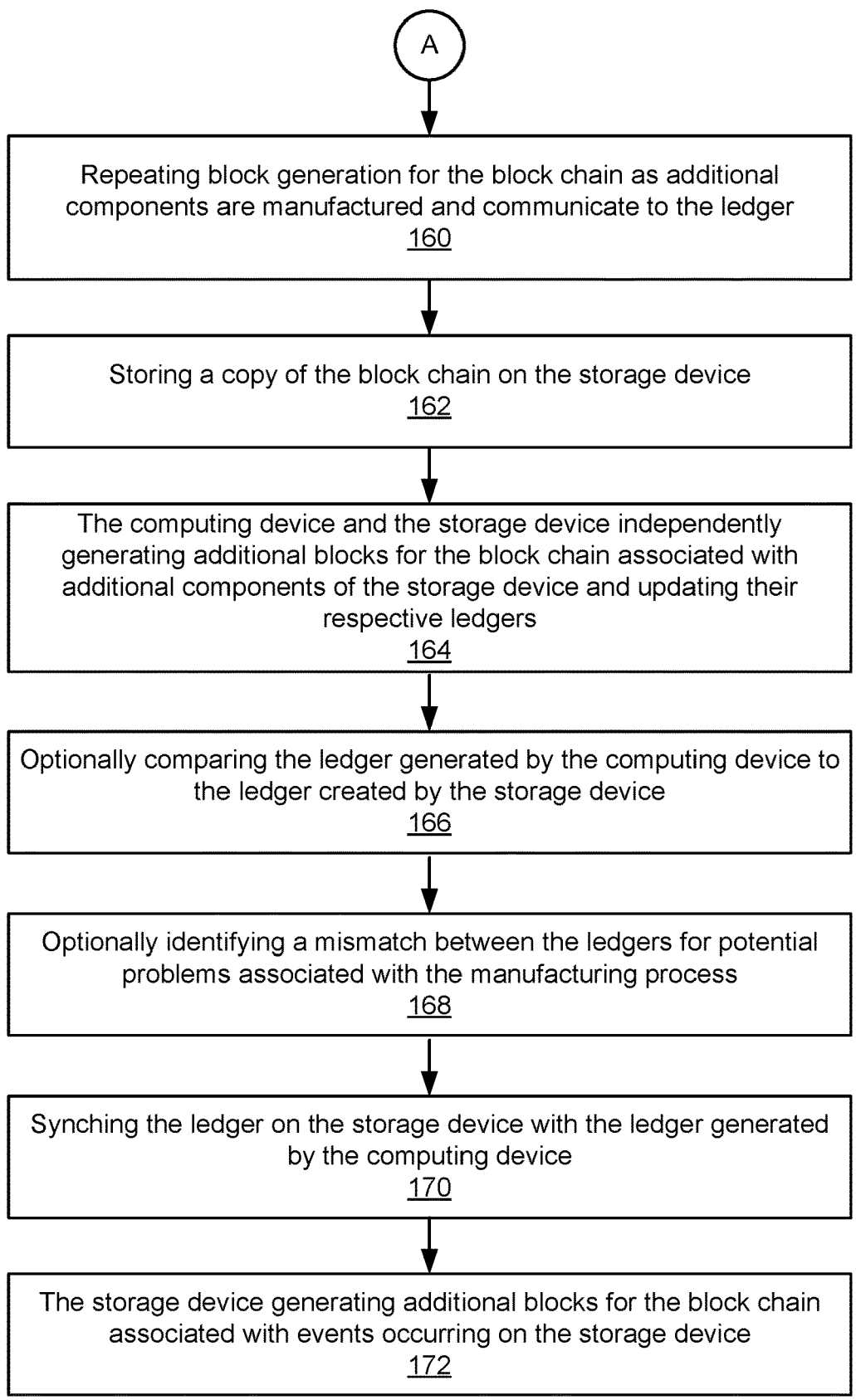

Referring now to FIG. 1C, at step 160 additional blocks for the block chain are generated as additional components are being manufactured. It is appreciated that in some embodiments, at step 162, a copy of the ledger is stored on the storage device being manufactured. It is appreciated that the ledger may be stored on the storage device when the storage device has sufficient computing capability to generate blocks of the block chain and to store the block chain. For example, when the integrated circuit 122 is manufactured, additional blocks for the block chain may be generated by the storage device and stored by the storage device. It is appreciated that in some embodiments, at steps 160-162, the storage device may still be connected to the test system.

At step 164, the computing device and the storage device independently generate additional blocks of the block chain for additional components being manufactured. In other words, each additional component of the storage device being manufactured causes the computing device and the storage device to separately and independently generate its respective block of the block chain. Accordingly, the ledger copy stored on the storage device is updated and the ledger copy of the computing device that may or may not be stored by the computing device is updated with the additional blocks being generated.

For example, when other components of the disk drive 100 are manufactured, their respective blocks are generated and the block chain is updated. More particularly, when component of the disk drive 100, e.g., control electronics 120, data storage disk 106, etc., is manufactured, the storage device and the computing device each generate their corresponding blocks of the block chain. It is appreciated that additional blocks of the block chain may be generated for other components of the disk drive 100 as they are being manufactured, e.g., actuator arm assembly 112, the control electronics 120, the voice coil motor assembly 118, the slider 126, the spindle motor 110, etc., and the respective ledgers are updated. In other words, two copies of the ledgers are created, one by the computing device and one by the storage device.

At step 166, optionally the ledgers created by the computing device and the storage device are compared. At step 168, a mismatch between the two ledgers are optionally identified that may indicate a problem that may have aroused during the manufacturing process of the storage device. Therefore, the manufacturer may investigate any potential problem during the manufacturing process. At step 170, the ledger stored on the storage device may be synched with the ledger generated by the computing device. It is appreciated that step 170 occurs before the storage device is shipped to a customer.

At step 172, the storage device generates additional blocks to be added to the block chain where each generated block is associated with an event occurring on the storage device or information associated with the storage device in operation.

For example, storage medium enterprise systems may be configured by a system administrator. The storage medium enterprise system may include one or more hard drives and/or one or more solid state drives. In order to configure the enterprise the system, the administrator may be asked to provide certain private information, e.g., name, email address, media access control (MAC) address, Internet Protocol (IP) address, etc. Furthermore, the storage medium enterprise may transmit certain operational information associated with the storage medium enterprise system, e.g., debug log files in response to occurrence of an event, debug data, telemetry stream of data in regular intervals, etc. to a processing center, e.g., manufacturer of the storage medium enterprise system. The operational information may include certain data associated with the operation of the storage medium enterprise system, e.g., data indicating that a hard drive is about to fail, data regarding utilization of a hard drive and/or solid state drive, data regarding bandwidth of a hard drive and/or solid state drive, data regarding storage capacity of a hard drive and/or solid state drive, number of reads, number of writes, head failures, drive failure responsive to occurrence of a requested service action, etc.

In some embodiments, a block chain technology may be utilized to encrypt the operational data and/or the private information associated with the storage device. According to some embodiments, new data may be encrypted and appended to the end of the block chain and prevent prior data within the block chain from being modified. As such, any data generated or processed, whether public/private, can be tracked and cannot be modified without breaking the block chain.

In some embodiments, service data generated by a storage device, e.g., configuration data, debug data such as IP addresses, I/O statistics, errors, etc., are similarly used to generate blocks of the block chain. In some embodiments, a block chain technology may be utilized to encrypt the generated service data and to ensure integrity of the device. According to some embodiments, new service data may be encrypted and appended to the end of the block chain and prevent prior data within the block chain from being modified. As such, any data generated or processed, whether public/private, can be tracked and cannot be modified without breaking the block chain. Furthermore, in some embodiments a layered block chain may be used where more sensitive data, e.g., private information, certain service data types, etc. may be encrypted in such a fashion that the service data is not visible to public or an unauthorized user while encrypting non sensitive data in a fashion that makes the data visible to public.

The storage device 100 may be configured by a system administrator. In order to configure the storage device 100 the administrator may be asked to provide certain private information, e.g., name, email address, media access control (MAC) address, Internet Protocol (IP) address, etc. Furthermore, the storage device 100 may generate certain operational information, e.g., debug log files, debug data, telemetry stream of data in regular intervals, etc. It is appreciated that the generation of the operational information may be in response to occurrence of a certain event or it may be generated automatically in frequent intervals. For example, the operational information may be generated when a certain event occurs, e.g., utilization of the storage medium exceeds a certain threshold, indication that a drive is about to fail, number of reads exceeds a certain threshold, number writes exceeds a certain threshold, a predetermined amount of time has passed, a certain amount of capacity has been utilized, number of reads of a drive, number of writes of a drive, head failures of a drive, drive failure responsive to occurrence of a requested service action, etc.

Operational data generated may be encrypted in a cryptographically secure manner, using a block chain technology. It is further appreciated that the private information of the administrator may similarly be encrypted in a cryptographically secure manner. According to some embodiments, a layered block chain may be used where a more sensitive data, e.g., private information, may be encrypted in such a fashion that the data is not visible to public or unauthorized user while encrypting non-sensitive data, e.g., operational data of the storage medium enterprise system, in a fashion that makes the data visible to public. For example, a cryptographic one-way function, e.g., hash function, password-based key derivation function 2, pseudorandom function such as SHA256, etc., may be used to encrypt the private information such that the content of the private information is kept private even if the block chain is made public. In some embodiments, the proof and/or meta data associated with the private information may be included in the attestation for the block chain but not the actual content of the private information itself such that when published the private information is kept private.

The data once encrypted is appended to the end of the block chain and prior data within the block chain is prevented from being modified without breaking the block chain. It is appreciated that the blocks may be generated using a hardware root key in order to instantiate the block chain. The hardware root key is a unique key for each component, e.g., a hard drive, a solid state drive, etc.

It is appreciated that in some embodiments, the generated block(s) of the block chain, by the storage device 100, may include information related to a service mode of operation of the storage device. Privacy regulations among others may require the device, e.g., storage device, to operate in a particular mode, e.g., SED, FIPS, etc. Operating in a particular mode, ensures functionality of the device in accordance with certain specifications and in accordance with some rules and regulations.

In some embodiments, an event triggering a block generation by the storage device, in operation (after it is shipped), may include a user unlocking a firmware download port, number of retries, servo events, etc. It is appreciated that according to some embodiments, commands and/or events causing block generation by the storage device may be user controllable. For example, the user of the storage device may modify the events and/or commands that cause new blocks of the block chain to be generated. Enabling the user to control block generation empowers the user to manage storage space as the ledger grows.

Accordingly, a block of a block chain is generated each time a component for the disk drive 100 is manufactured and the generated block may be communicated from the disk drive 100 to the ledger. Thus, the origin and authenticity of each component and the disk drive as a whole may be verified and determined as reflected through their corresponding blocks within the block chain. A copy of the ledger is created and maintained by a computing device separate from the storage device where the ledger is not updated after the storage device is shipped. In contrast, the storage device updates its own ledger based on events and information associated with the storage device. At a later date, if the disk drive 100 is returned to the manufacturer the ledgers as maintained by the computing device and as updated by the storage device may be compared to confirm authenticity of the disk drive 100. Furthermore, the updated ledger stored on the storage device can be used to determine whether the disk drive 100 operated in the fashion that it was supposed to and to address any errors in the drive, etc. Thus, the origin and authenticity of the disk drive 100 can be verified even after the drive ends up in the gray market using the block chain. It is appreciated that the authenticity of various components may similarly be verified for other storage devices, e.g., solid state drive. It is further appreciated that the verification of authenticity is equally applicable to software components, e.g., firmware.

Figure 2A:
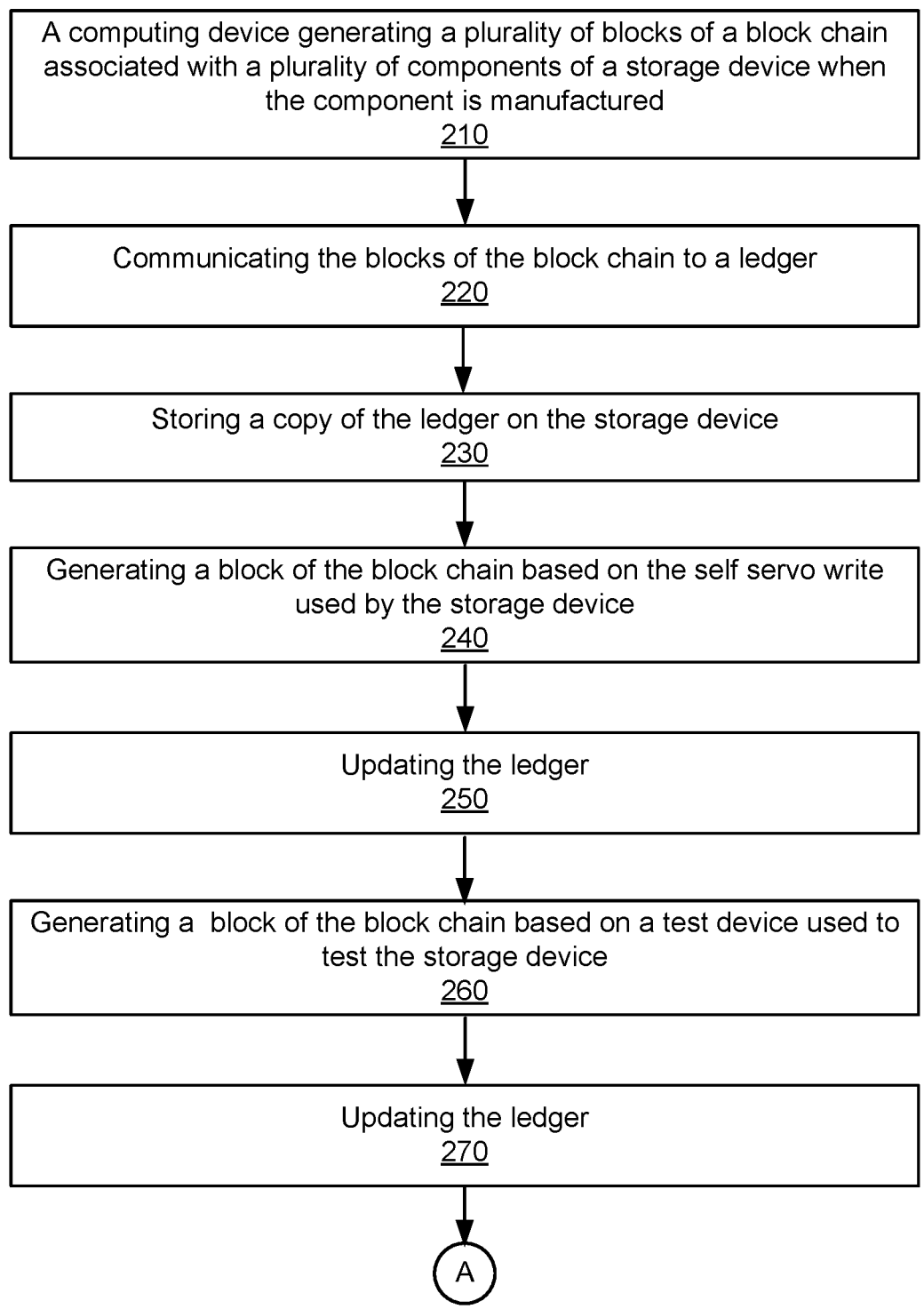
FIGS. 2A-2B show a method of generating a block chain associated with manufacturing of a storage device according to one aspect of the present embodiments.
Figure 2B:
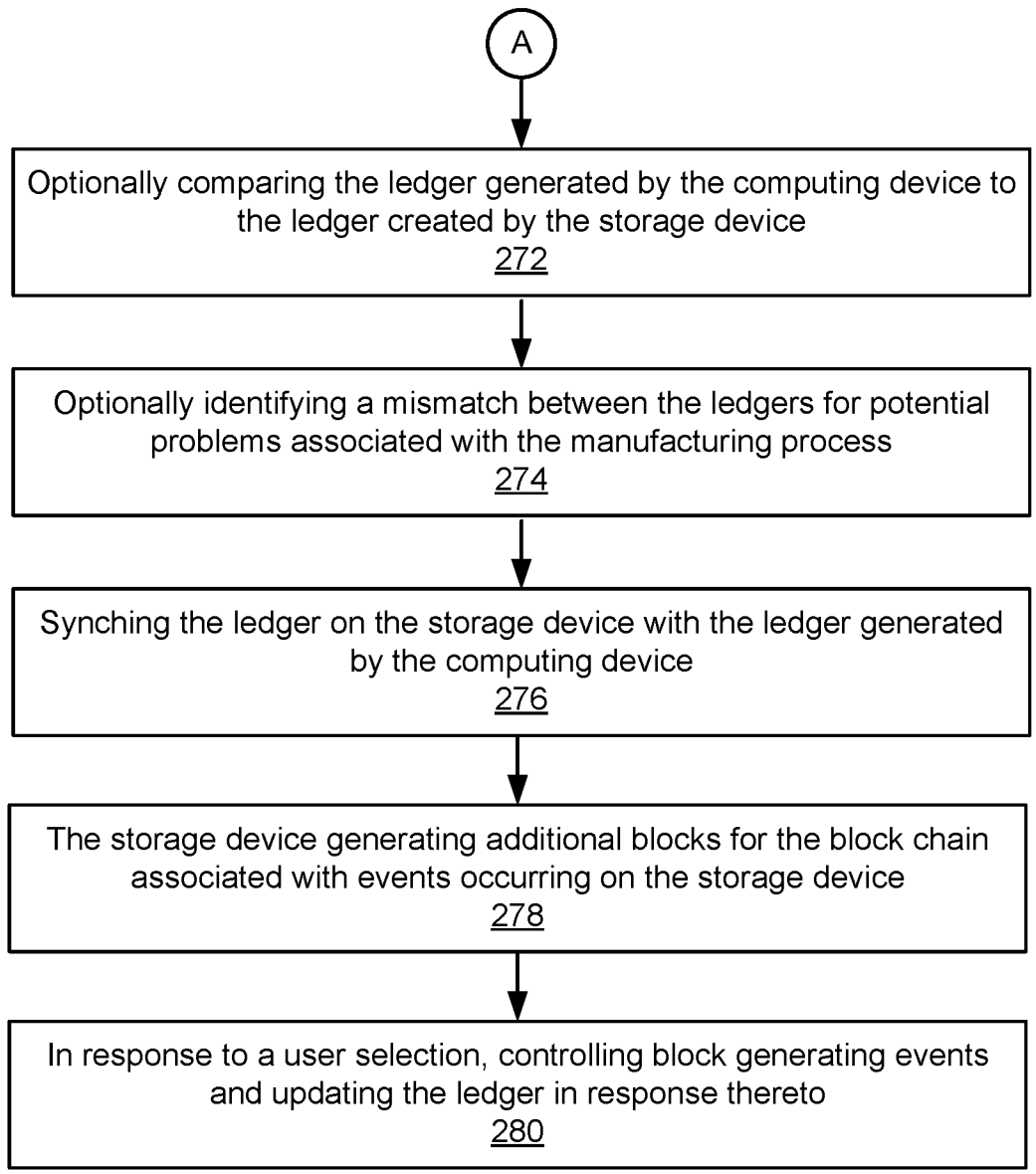

Referring now to FIGS. 2A-2B a method of generating a block chain associated with manufacturing of a storage device according to one aspect of the present embodiments is shown. At step 210, a computing device (similar to the one described in FIGS. 1B-1C) generates a plurality of blocks of a block chain. The plurality of blocks is associated with a plurality of components of a storage device when the components are being manufactured. For example, a block of a block chain is created for each component, e.g., the actuator arm assembly 112, data storage disk 106, a voice coil motor 118, control electronics 120, motor assembly 118, a slider 126, or the spindle motor 110, etc. At step 220, the blocks that are generated are communicated to a ledger. The ledger may be stored by the computing device or by a device separate from the computing device. It is appreciated that the block being generated may include certain information regarding the component being manufactured, e.g., model number, serial number, self-servo write which is the code to rewrite servo, testers used to test the component(s), version of the firmware, etc.

At step 230, a copy of the ledger is stored on the storage device being manufactured. It is appreciated that the ledger may be stored on the storage device when the storage device has sufficient computing capability to generate blocks of the block chain. For example, when the integrated circuit 122 is manufactured, additional blocks for the block chain may be generated by the storage device.

At step 240, a block of the block chain is generated based on the self-servo write used by the storage device. At step 250, the ledger is updated. At step 260, a block of the block chain is generated based on the tester, e.g., test device including model and serial number and firmware, that is being used to test the storage device. At step 270, the ledger is updated. It is appreciated that steps 240-270 may be performed independently and separately by the computing device as well as the storage device. As such, each respective ledger may be updated.

At step 272, optionally the ledgers created by the computing device and the storage device are compared. At step 274, a mismatch between the two ledger are optionally identified that may indicate a problem that may have aroused during the manufacturing process of the storage device. Therefore, the manufacturer may investigate any potential problem during the manufacturing process. At step 276, the ledger stored on the storage device may be synched with the ledger generated by the computing device. It is appreciated that step 276 occurs before the storage device is shipped to a customer. In some embodiments, a truncated version of the block chain may be stored by the storage device. For example, a hash value of the block chain may be stored on the storage device in order to save storage space.

At step 278, the storage device generates additional blocks to be added to the block chain where each generated block is associated with an event occurring on the storage device or information associated with the storage device in operation, as described in FIGS. 1B-1C. At step 280, the block generation based on events and ledger update on the storage device is controlled responsive to a user input.

Accordingly, a block of a block chain is generated each time a component for the disk drive 100 is manufactured and the generated block may be communicated from the disk drive 100 to the ledger. Thus, the origin and authenticity of each component and the disk drive as a whole may be verified and determined as reflected through their corresponding blocks within the block chain. A copy of the ledger is created and maintained by a computing device separate from the storage device where the ledger is not updated after the storage device is shipped. In contrast, the storage device updates its own ledger based on events and information associated with the storage device. In other words, the ledger stored on the storage device grows because it appends additional blocks to the block chain based on events/commands and information related to the operation of the storage device whereas the ledger stored by the computing device remains static. However, in some embodiments, the ledger stored by the computing device may be updated based on the blocks generated by the storage device during operation by transmitting the newly generated blocks to the ledger that is stored by the computing device or any other device other than the storage device. At a later date, if the disk drive 100 is returned to the manufacturer the ledgers as maintained by the computing device and as updated by the storage device may be compared to confirm authenticity of the disk drive 100. Furthermore, the updated ledger stored on the storage device can be used to determine whether the disk drive 100 operated in the fashion that it was supposed to and to address any errors in the drive, etc. Thus, the origin and authenticity of the disk drive 100 can be verified even after the drive ends up in the gray market using the block chain. It is appreciated that the authenticity of various components may similarly be verified for other storage devices, e.g., solid state drive. It is further appreciated that the verification of authenticity is equally applicable to software components, e.g., firmware.

Figure 3:
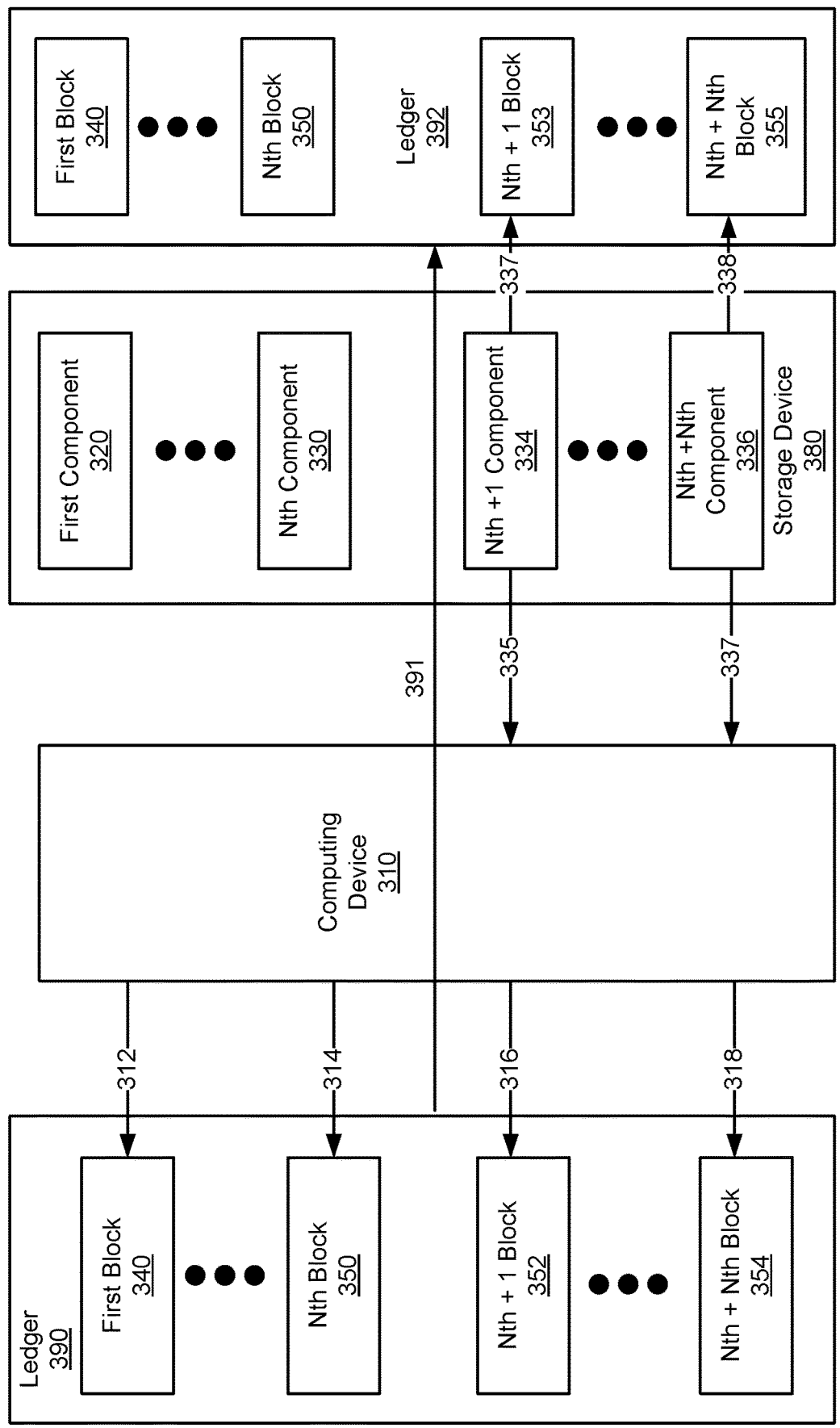
FIG. 3 shows a system of generating a block chain associated with manufacturing of a storage device according to one aspect of the present embodiments.

FIG. 3 shows a system of generating a block chain associated with manufacturing of a storage device according to one aspect of the present embodiments. The system shows a computing device 310 similar to the one described in FIGS. 1B-2B. The computing device 310 may generate a first block 340 of a block chain when a first component 320 of a storage device 380 is manufactured. Accordingly, a ledger 390 may be updated with the first block 340. The process continues for each subsequent component of the storage device 380 as they are being manufactured. For example, the computing device 310 generates Nth block 350 of the block chain and updates the ledger 390 when the Nth component 330 of the storage device 380 is manufactured. It is appreciated that the ledger may be stored by the computing device 310 or by a device separate from the computing device 310. In some embodiments, a copy of the ledger 390 that includes the first block 340, . . . , Nth block 350 is transmitted 391 to the storage device 380 in order to create a copy of the ledger 392 when the storage device 380 has sufficient computing capability to generate its own blocks of the block chain. The ledger 392 is stored by the storage device 380.

It is appreciated that additional blocks of the block chain are generated for additional components of the storage device 380. It is appreciated that the additional blocks are generated by the computing device 310 and by the storage device 380 independently. For example, when Nth+1 component 334 is manufactured, the computing device 310 generates the Nth+1 block 352 of the block chain and the storage device 380 generates the Nth+1 block 353 of the block chain independently. It is appreciated this process continues until all the components for the storage device 380 are manufactured and until the storage device 380 is ready for shipment to a customer. For example, when Nth+Nth component 336 is manufactured, the computing device 310 generates the Nth+Nth block 354 of the block chain and the storage device 380 generates the Nth+Nth block 355 of the block chain independently. Thus, ledgers 390 and 392 are updated accordingly. It is appreciated that in some embodiments, if no error has occurred during the manufacturing process the ledgers 390 and 392 contain the same information, e.g., Nth+1 block 353 is the same as Nth+1 block 352, and Nth+Nth block 354 is the same as the Nth+Nth block 355, etc. However, if there is a mismatch between the two ledgers, the manufacturer may further investigate the issue and resolve it.

It is appreciated that in some embodiments, the ledger 392 may be updated and synched with ledger 390 before shipment of the storage device 380. As presented above, in FIGS. 1B-2B, once the storage device 380 is shipped additional blocks may be generated, based on events/commands and information related to operation of the storage device 380, and the ledger 392 may be further updated with the new blocks. In other words, the ledger 392 may grow while ledger 390 remains static. As presented above, the generation of the additional blocks for ledger 392 is user controllable to manage space. It is further appreciated that in some embodiments, the storage device 380 that has network capability may transmit the newly generated blocks of the ledger 392 to update the ledger 390.

Accordingly, a block of a block chain is generated each time a component for the disk drive 100 is manufactured and the generated block may be communicated from the disk drive 100 to the ledger. Thus, the origin and authenticity of each component and the disk drive as a whole may be verified and determined as reflected through their corresponding blocks within the block chain. In some embodiments, a copy of the ledger is created and maintained by a computing device separate from the storage device where the ledger is not updated after the storage device is shipped. In contrast, the storage device updates its own ledger based on events and information associated with the storage device. At a later date, if the disk drive 100 is returned to the manufacturer the ledgers as maintained by the computing device and as updated by the storage device may be compared to confirm authenticity of the disk drive 100. Furthermore, the updated ledger stored on the storage device can be used to determine whether the disk drive 100 operated in the fashion that it was supposed to and to address any errors in the drive, etc. Thus, the origin and authenticity of the disk drive 100 can be verified even after the drive ends up in the gray market using the block chain. It is appreciated that the authenticity of various components may similarly be verified for other storage devices, e.g., solid state drive. It is further appreciated that the verification of authenticity is equally applicable to software components, e.g., firmware.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A method comprising:
    generating a plurality of blocks of a block chain wherein the plurality of blocks is associated with components of a storage device, wherein the plurality of blocks is generated by a device other than the storage device when the components are manufactured;
    storing a copy of a ledger associated with the generated blocks on the storage device when the storage device comprises computing power sufficient to generate blocks of a block chain; and
    generating additional blocks of the block chain wherein the additional blocks of the block chain are associated with additional components of the storage device when the additional components are manufactured, and wherein the additional blocks are generated independently by the device and by the storage device and wherein respective ledgers are updated.

2. The method as described in claim 1 further comprising:
    comparing ledger from the storage device to the ledger from the device.

3. The method as described in claim 1 further comprising synching the ledger stored on the storage device with the ledger from the device after the generating the additional blocks and prior to shipping the storage device.

4. The method as described in claim 1, wherein the storage device is selected from a group consisting of a hard drive and a solid state drive.

5. The method as described in claim 1 further comprising:
    in response to events associated with operation of the storage device, generating a set of blocks of the block chain by the storage device and updating the ledger associate therewith.

6. The method as described in claim 5, wherein the events is selected from a group consisting of drive failure, a number of reads, a number of writes, utilization of the storage device, Input/Output (I/O) statistics, host name, errors, auto login information, configuration information, and debug information.

7. The method as described in claim 1, wherein the first component is selected from a group consisting of a hardware component and a software component.

8. The method as described in claim 1, wherein a block of the block chain is associated with a test device used to test the storage device.

9. A method comprising:
    generating, by a computing device, a first plurality of blocks of a block chain wherein the first plurality of blocks is associated with components of a storage device;
    generating, by at least one of the computing device and the storage device, a second plurality of blocks of the block chain wherein the second plurality of blocks is associated with testing of the components of the storage device; and
    storing a ledger associated with the first plurality of blocks and the second plurality of blocks on the storage device.

10. The method as described in claim 9, wherein the first plurality of blocks is generated by a device other than the storage device when the components are manufactured.

11. The method as described in claim 10 further comprising generating additional blocks of the block chain wherein the additional blocks of the block chain are associated with additional components of the storage device when the additional components are manufactured, and wherein the additional blocks are generated independently by the device and by the storage device and wherein respective ledgers are updated.

12. The method as described in claim 11 further comprising:
    comparing ledger from the storage device to the ledger from the device.

13. The method as described in claim 9, wherein the ledger is stored in the storage device when the storage device comprises computing power sufficient to generate blocks of a block chain.

14. The method as described in claim 9, wherein the storage device is selected from a group consisting of a hard drive and a solid state drive.

15. The method as described in claim 9 further comprising:
    in response to events associated with operation of the storage device, generating a set of blocks of the block chain by the storage device and updating the ledger associate therewith, wherein the events is selected from a group consisting of drive failure, a number of reads, a number of writes, utilization of the storage device, Input/Output (I/O) statistics, host name, errors, auto login information, configuration information, and debug information.

16. A system comprising:
    a computing device configured to generate a first plurality of blocks of a block chain wherein the first plurality of blocks is associated with components of a storage device, wherein the first plurality of blocks is generated by a device other than the storage device when the components are manufactured; and
    the storage device configured to receive a copy of a ledger associated with the generated first plurality of blocks and further configured to store the ledger thereon, wherein the ledger is received from the computing device when the storage device comprises computing power sufficient to generate blocks of a block chain,
    wherein the computing device is further configured to generate a second plurality of blocks of the block chain associated with additional components of the storage device when the additional components are manufactured,
    and wherein the storage device is further configured to generate a third plurality of blocks of the block chain associated with the additional components of the storage device when the additional components are manufactured, wherein the second plurality of blocks and the third plurality of blocks are generated independently and wherein respective ledgers are updated.

17. The system as described in claim 16, wherein the computing device is further configured to synch the ledger stored on the storage device with the ledger from the device prior to shipping the storage device.

18. The system as described in claim 16, wherein the storage device is selected from a group consisting of a hard drive and a solid state drive, and wherein the storage device is further configured to generate a set of blocks of the block chain by the storage device and further configured to update the ledger associate therewith in response to events associated with operation of the storage device, wherein the events is selected from a group consisting of drive failure, a number of reads, a number of writes, utilization of the storage device, Input/Output (I/O) statistics, host name, errors, auto login information, configuration information, and debug information.

19. The system as described in claim 16, wherein a component of the components of the storage device is selected from a group consisting of a hardware component and a software component.

20. The system as described in claim 16, wherein a block of the block chain is associated with a test device used to test the storage device.

* * * * *